US012703028B2

(12) United States Patent
Hansen et al.

(10) Patent No.: US 12,703,028 B2

(45) Date of Patent: Aug. 11, 2026

(54) DEBRIS COLLECTION ASSEMBLY

(71) Applicant: THE BOEING COMPANY, Arlington, VA (US)

(72) Inventors: Jeffrey Michael Hansen, Moses Lake, WA (US); Brenda Brigette Nolan, Tacoma, WA (US); Joshua Richard Burch, Moses Lake, WA (US)

(73) Assignee: The Boeing Company, Arlington, VA (US)

( * ) Notice: Subject to any disclaimer, the term of this patent is extended or adjusted under 35 U.S.C. 154(b) by 41 days.

(21) Appl. No.: 18/756,243

(22) Filed: Jun. 27, 2024

(65) Prior Publication Data

US 2026/0000255 A1 Jan. 1, 2026

(51) Int. Cl.

| | |
|---|---|
| ***B23B 47/28*** | (2006.01) |
| ***B23B 47/34*** | (2006.01) |
| ***B23Q 11/00*** | (2006.01) |
| *A47L 7/00* | (2006.01) |

(52) U.S. Cl.

CPC ............ *B23B 47/287* (2013.01); *B23B 47/34* (2013.01); *B23Q 11/0046* (2013.01); *A47L 7/0095* (2013.01)

(58) Field of Classification Search

CPC .... B23B 47/287; B23B 47/34; B23Q 11/0046

See application file for complete search history.

(56) References Cited

U.S. PATENT DOCUMENTS 2,349,156 A * 5/1944 Fischer .............. B23Q 11/0046 408/124

3,753,295 A * 8/1973 Hecklinger ............ G01B 5/242 33/32.2

5,775,856 A * 7/1998 Woodard .............. B23B 47/287 408/103

(Continued)

FOREIGN PATENT DOCUMENTS

CN 212127248 U * 12/2020

DE 202007002845 U1 * 6/2007 ........... B23B 49/023

(Continued)

OTHER PUBLICATIONS

English Translation of FR-3004667-A1 (Year: 2014).*

*Primary Examiner* — Eric A. Gates

(74) *Attorney, Agent, or Firm* — Joseph M. Butscher; Carroll, Hoette & Butscher, LLC

(57) ABSTRACT

A debris collection assembly includes a jig and an adapter insert. A front wall of the jig defines an aperture therethrough. A back wall of the jig defines an adapter opening that aligns with the aperture. The jig includes a vacuum port and defines an interior cavity that fluidly connects the aperture, the adapter opening, and the vacuum port. The adapter insert is removably loaded through the adapter opening into the interior cavity. The adapter insert either defines an orifice sized to receive a drill bit or defines a cylindrical channel sized to receive a drill bushing that defines the orifice. The orifice is oriented to allow the drill bit to extend through the aperture in the front wall to drill (Continued)

into a work piece. Negative pressure at the vacuum port draws airflow through the interior cavity and captures debris generated from drilling.

20 Claims, 7 Drawing Sheets

(56) References Cited

U.S. PATENT DOCUMENTS

| | | | | |
|---|---|---|---|---|
| 6,499,224 | B1 * | 12/2002 | Asick | B23B 47/287<br>83/438 |
| 7,425,109 | B2 * | 9/2008 | Simm | B23Q 11/0046<br>173/198 |
| 8,052,357 | B2 * | 11/2011 | Bruntner | B23B 47/00<br>408/67 |
| 9,770,764 | B1 * | 9/2017 | Schmier, II | B23B 47/28 |
| 10,589,363 | B2 * | 3/2020 | Beydler | B23B 51/0054 |
| 11,344,955 | B2 * | 5/2022 | Majer | B23B 47/28 |
| 12,479,057 | B2 * | 11/2025 | Hansen | B23Q 11/0046 |
| 2020/0086440 | A1 * | 3/2020 | Rompel | B23Q 11/0046 |
| 2023/0143611 | A1 * | 5/2023 | Bate | F16B 5/0642<br>29/897.2 |

FOREIGN PATENT DOCUMENTS

| | | | | |
|---|---|---|---|---|
| DE | 202015003157 | U1 * | 5/2015 | B23B 49/026 |
| FR | 3004667 | A1 * | 10/2014 | B23Q 11/0046 |

* cited by examiner

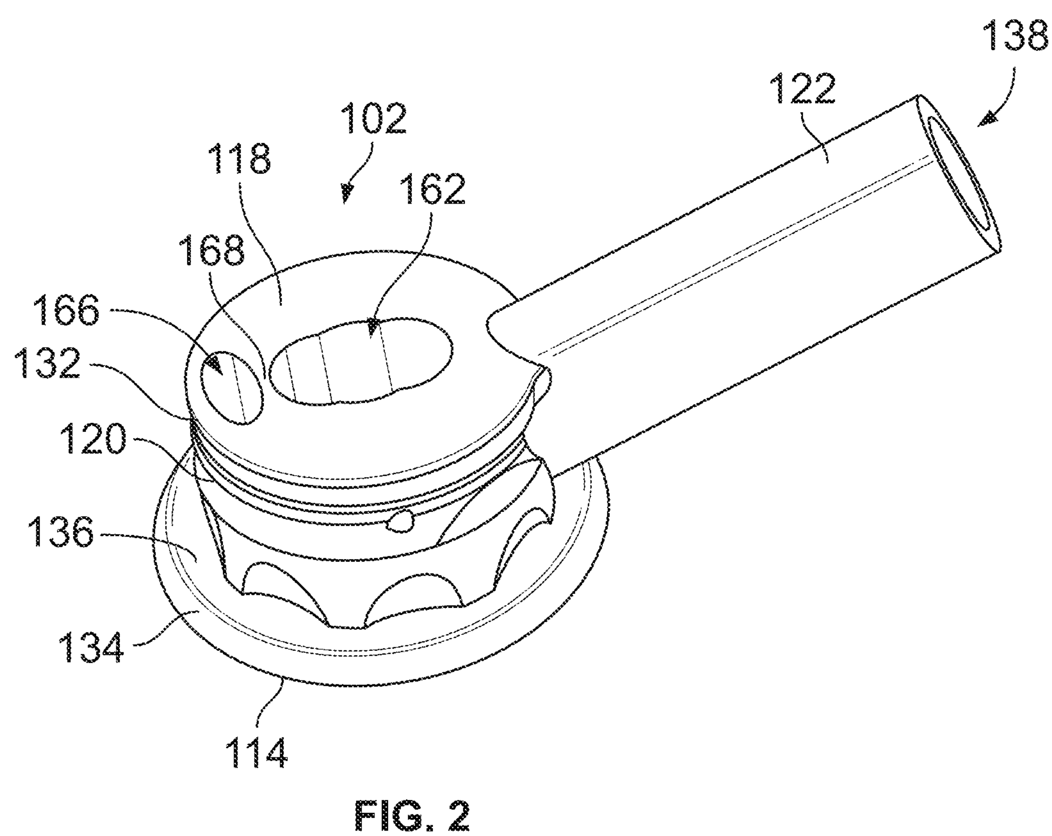
FIG. 2
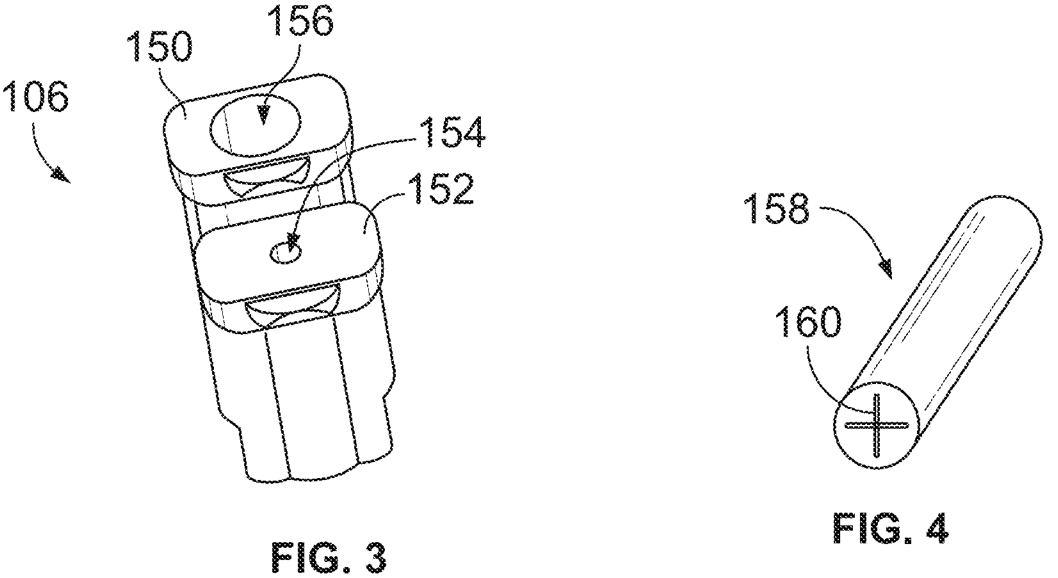
FIG. 3
FIG. 4

DEBRIS COLLECTION ASSEMBLY

FIELD OF THE DISCLOSURE

Embodiments of the present disclosure generally relate to tools associated with drilling holes into work pieces.

BACKGROUND OF THE DISCLOSURE

Drilling into a work piece, such as a panel or post, typically generates swarf, which is debris in the form of shavings, chips, dust, powder, and/or the like. The swarf is typically collected after drilling during a cleaning operation. In some applications, it may be difficult to clean up all of the swarf due to accessibility issues. In other applications, the drilling operation may occur in an environment that includes safety-critical and/or sensitive instruments, electronics, and/or equipment. The presence of swarf, sometimes referred to as foreign object debris (FOD), in these sensitive environments could degrade or damage the instruments, electronics, and/or equipment. Typically, a mechanic drilling in a sensitive environment may mask the surrounding areas and/or install a bag around the drill site to catch and contain the swarf from the drilled hole. These containment measures are time-consuming and ineffective at preventing FOD.

Some drill guide tools are designed to assist a user with drilling a hole perpendicular to the surface of a work piece. Some drill guides have a vacuum attachment that connects to a cup of the drill guide to suck swarf from the cup. The known drill guides that incorporate vacuum are ineffective at preventing FOD, as chips and other debris regularly escape the cup. Furthermore, larger pieces of swarf tend to plug the vacuum hose, rendering the device ineffective at capturing the swarf and preventing FOD.

SUMMARY OF THE DISCLOSURE

A need exists for tooling to effectively, efficiently, and reliably contain and collect swarf during a drilling operation. The tooling would avoid or reduce post-drilling clean-up operations and substantially reduce the risk of damage and/or degradation caused by debris exposure to sensitive instruments, electronics, and/or equipment. A need exists for tooling to break up larger pieces of swarf to avoid plugging a vacuum hose and maintain the negative pressure that pulls the swarf from the drilling site.

With those needs in mind, certain embodiments of the present disclosure provide a debris collection assembly that includes a jig and an adapter insert. A front wall of the jig defines an aperture therethrough. A back wall of the jig defines an adapter opening that aligns with the aperture. The jig includes a vacuum port and defines an interior cavity that fluidly connects the aperture, the adapter opening, and the vacuum port. The adapter insert is removably loaded through the adapter opening into the interior cavity. The adapter insert either defines an orifice sized to receive a drill bit or defines a cylindrical channel sized to receive a drill bushing that defines the orifice. The orifice is oriented to allow the drill bit to extend through the aperture in the front wall to drill into a work piece. Negative pressure at the vacuum port draws airflow through the interior cavity and captures debris generated from drilling.

Certain embodiments of the present disclosure provide a method of collecting and containing swarf during a drilling operation. The method includes securing a jig in place relative to a work piece. The jig includes a front wall and a back wall opposite the front wall. The front wall defines an aperture therethrough. The back wall defines an adapter opening that aligns with the aperture in the front wall. The jig includes a vacuum port and defines an interior cavity that fluidly connects the aperture, the adapter opening, and the vacuum port. The method includes loading a first adapter insert through the adapter opening into the interior cavity of the jig. The first adapter insert one of (i) defines an orifice therethrough that is sized to receive a drill bit or (ii) defines a cylindrical channel that is sized to receive a drill bushing that defines the orifice. The orifice is oriented to allow the drill bit to extend through the aperture in the front wall. The method includes drawing airflow, via a vacuum coupled to the vacuum port of the jig, along an air pathway that extends from an air inlet of the jig through the interior cavity to the vacuum port. The method includes drilling a hole in the work piece via a drill coupled to the drill bit that is within the orifice of the first adapter insert. The airflow is drawn through the interior cavity to capture debris generated from drilling the hole.

Certain embodiments of the present disclosure provide a debris collection assembly that includes a jig, a first adapter insert, and a clamp. The jig includes a housing and a flange. The housing includes a front wall and a back wall opposite the front wall. The front wall defines an aperture therethrough. The back wall defines an adapter opening that aligns with the aperture in the front wall. The jig includes a vacuum port configured to attach to a vacuum tube. The jig defines an interior cavity that fluidly connects the aperture, the adapter opening, and the vacuum port. The flange protrudes from the front wall of the housing beyond one or more edges of the housing. The first adapter insert is removably loaded through the adapter opening into the interior cavity. The first adapter insert one of (i) defines an orifice therethrough that is sized to receive a drill bit or (ii) defines a cylindrical channel that is sized to receive a drill bushing that defines the orifice. The orifice is oriented to allow the drill bit to extend through the aperture in the front wall to drill into a work piece. Negative pressure at the vacuum port draws airflow through the interior cavity and captures debris generated from drilling. The clamp includes a first portion and a second portion. The first portion is configured to be coupled to the work piece via at least a first fastener. The second portion is configured to contact a back surface of the flange to secure the jig in place on the work piece.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein:

FIG. 2 illustrates a jig of the debris collection assembly according to an embodiment.

FIG. 3 illustrates two adapter inserts of the debris collection assembly according to an embodiment.

FIG. 4 illustrates an optical alignment element of a sight guide adapter insert of the debris collection assembly according to an embodiment.

DETAILED DESCRIPTION OF THE DISCLOSURE

Figure 1:
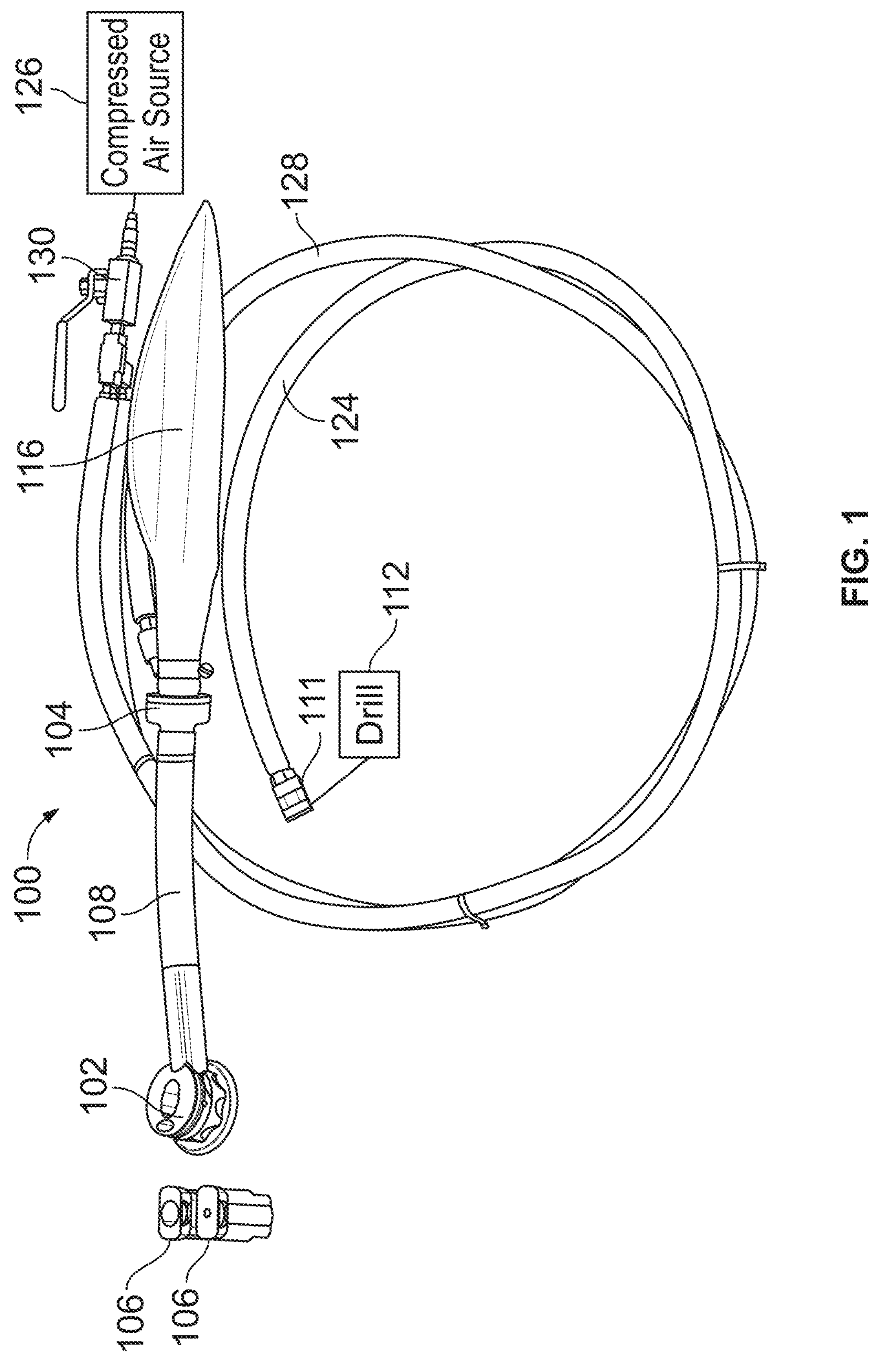
FIG. 1 illustrates a debris collection assembly according to an embodiment.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular condition can include additional elements not having that condition.

Examples of the present disclosure provide a drilling tool assembly that captures and collects swarf during a drilling operation to prohibit the swarf from entering the surrounding environment and interfering with instruments, electronics, wiring, and/or equipment. The term swarf is used herein interchangeably with the term debris. The tool assembly is referred to herein as a debris collection assembly. The debris collection assembly is designed to enable a user to drill precision holes while controlling and containing the swarf generated from the drilling operation. In an example, the debris collection assembly may be used to drill holes in an aircraft framework. The debris collection assembly may be a universal drill guide that is applicable on different types of work pieces and different locations along a same work piece to drill multiple different holes. In embodiments described herein the debris collection assembly controls and contains the swarf by providing a high speed vacuum that pulls swarf from the drill site and captures the swarf in a vacuum bag. The debris collection assembly includes an adapter insert that is designed to break up large pieces of swarf into smaller pieces that are captured by the air stream of the vacuum and pulled into the vacuum bag. The debris collection assembly includes a jig that holds the adapter insert, and a clamp that secures the jig in place on the work piece for the drilling operation.

At least one benefit of the debris collection assembly described herein is improving the effectiveness and reliability of debris containment over known containment methods and devices. As a result, the debris collection assembly may significantly reduce the risk of damaging and/or degrading operation of nearby instruments, wiring, electronics, and/or equipment due to debris exposure (e.g., FOD). Another benefit of the debris collection assembly may be that a post-drilling clean-up process is avoided because essentially all of the debris is collected and contained. A third benefit of the debris collection assembly described herein is greatly increasing the efficiency of a drilling operation, particularly drilling in a sensitive environment. For example, a conventional drilling operation in a sensitive environment may take many hours, even multiple days, when considering the time spent masking the surrounding environment; installing and/or constructing a bag to capture debris; drilling; and then cleaning up. Use of the debris collection assembly could reduce the man hours for the same drilling operation by over 50% or more. The debris collection assembly may also alleviate physical demands of drilling on a mechanic, which together with the increased efficiency can greatly improve the productivity of the mechanic.

FIG. 1 illustrates a debris collection assembly 100 according to an embodiment. The debris collection assembly 100 includes at least a jig 102, a vacuum 104, and at least one adapter insert 106. The jig 102 is designed to affix to a work piece for drilling a hole into the work piece. The jig 102 mechanically and fluidly couples to the vacuum 104. For example, the jig 102 may be coupled to the vacuum 104 via a tube (e.g., vacuum tube) 108. The tube 108 may be a length of a flexible hose, a rigid hollow member, or the like. The tube 108 may be a portion of the vacuum 104 or a separate component that bridges a gap between the vacuum 104 to the jig 102. Each adapter insert 106 is discrete from the jig 102, as indicated by the spaced-apart location of the adapter insert 106 relative to the jig 102 in FIG. 1. Each adapter insert 106 is sized and shaped to be removably loaded into the jig 102. The jig 102 is designed to accommodate one adapter insert 106 at a time.

FIG. 2 illustrates the jig 102 of the debris collection assembly 100 according to an embodiment. The jig 102 includes a front wall 114, a back wall 118, and one or more side walls 120 that extend from the front wall 114 to the back wall 118. To drill a hole in a work piece, the jig 102 is oriented so the front wall 114 faces a surface of the work piece. The front wall 114 may abut the work piece. The back wall 118 of the jig 102 defines an adapter opening 162 therethrough. The adapter opening 162 is sized and shaped to accommodate and hold one adapter insert 106. For example, each adapter insert 106 is removably coupled to the jig 102 by loading the adapter insert 106 into the adapter opening 162.

In an example, the jig 102 includes a housing 132 and a flange 134. The housing 132 extends from the flange 134. The housing 132 defines the back wall 118 and houses the adapter insert 106. The flange 134 defines the front wall 114. The flange 134 may project laterally beyond edges of the housing 132. The flange 134 may be a hold-down lip that is used to secure the jig 102 to a work piece. For example, a clamp may contact a back surface 136 of the flange 134 to retain the flange 134 in contact with the work piece. The clamp may be a toe clamp. The clamp may at least partially surround the housing 132. In an example, the clamp may couple to the housing 132. For example, the clamp may grip at least one side 120 of the housing 132.

In an example, the housing 132 of the jig 102 is disc-shaped. The flange 134 may also be disc-shaped. The housing 132 may have a curved perimeter. In an example, the housing 132 is cylindrical. For example, the housing 132 only has one side wall 120 that continuously curves along the perimeter. The back wall 118 may be relatively planar. The back wall 118 may have a circular shape. The flange 134 may have a circular shape. The flange 134 may have a greater radius than the housing 132, so the flange 134 radially projects beyond the side wall 120 of the housing 132. In another example, the housing 132 may have an elongated curved shape, such that the cross-section is an ellipse or oval rather than circle.

The curved perimeter may enable the jig 102 to be repositioned at different orientations relative to a clamp and the work piece for ease of accessibility. For example, a user can rotate the jig 102 relative to the work piece to select a desired orientation. The desired orientation may be selected to permit the user to access the jig 102 to align the jig 102 with a planned hole location on the work piece, to clamp the jig in place, and to approach the jig 102 with a drill for drilling a hole at the planned hole location. In another example, the housing 132 may be a polygon with multiple perimeter surfaces along the side between the flange 134 and the back wall 118. For example, the housing 132 may be hexagonal, octagonal, or the like. The flange 134 may continue to project beyond the edges of the housing 132 to provide a hold-down lip for securing the jig 102 to the work piece via the clamp.

The jig 102 includes a vacuum port 122 that is designed to couple to the vacuum tube 108. The vacuum port 122 may be a hollow pipe that projects from the housing 132. The vacuum port 122 may project from the side wall 120. The vacuum tube 108 may couple to a distal end 138 of the vacuum port 122 via a connector device. In another example, the vacuum port 122 may extend from the back wall 118 instead of, or in addition to, extending from the side wall 120. In an alternative embodiment, the vacuum port 122 may be an opening in the exterior surface of the jig 102 rather than a hollow projection. A connector may be used to plug the end of the vacuum tube 108 into the opening of the vacuum port 122.

The jig 102 may include an air inlet 166 through which ambient air from the environment may be drawn into the interior of the housing 132. In an example, the air inlet 166 is an opening or hole in the back wall 118. The adapter opening 162 is located between the air inlet 166 and the vacuum port 122. The air that enters the inlet 166 flows across the adapter insert 106 (that is loaded in the adapter opening 162) before exiting the housing 132 through the vacuum port 122. In the illustrated example, the air inlet 166 is separated from the adapter opening 162 by an intervening segment 168 of the back wall 118. Alternatively, the intervening segment 168 may be omitted such that the air inlet 166 is an extension of the adapter opening 162.

In an embodiment, the jig 102 has a unitary, one-piece body. For example, the flange 134, the housing 132, and the vacuum port 122 may be seamlessly connected. In an example, the jig 102 is additively manufactured. For example, the jig 102 may be formed by sequentially depositing and fusing a source material layer by layer according to a digital build plan. Additive manufacturing may also be used to construct the adapter inserts 106. A benefit of additive manufacturing is that the build plans for the jig and adapter inserts may be electronically communicated to a customer with a license to enable the customer to build the parts with in-house additive manufacturing machines. This process may allow the customer to make the jig and adapter insert more quickly and economically than shipping physical parts through the mail. In another example, the jig 102 may be formed by a different manufacturing process, such as injection molding. The jig 102 may be composed of a plastic material, a metal material, or the like.

FIG. 3 illustrates two adapter inserts 106 of the debris collection assembly 100 according to an embodiment. The adapter inserts 106 include a sight guide 150 and a drill guide 152. Each of the sight guide 150 and the drill guide 152 is designed to be received in the adapter opening 162. The drill guide 152 receives and guides a corresponding drill bit. For example, the drill guide 152 is a body that defines an orifice 154 the length of the body. The orifice 154 may be sized only slightly greater than a diameter of the drill bit to limit lateral movement and tilt of the drill bit relative to the drill guide 152. The drill guide 152 may hold the drill bit perpendicular to the front wall 114 of the jig 102 to provide a perpendicular drilling angle. The debris collection assembly 100 may include multiple different drill guide adapter inserts for receiving and guiding different corresponding drill bits, such as different types and/or sizes of drill bits.

The sight guide 150 is a body that defines a cavity 156 (e.g., hole) the length of the body. The cavity 156 is sized and shaped to accommodate an optical alignment element 158 therein. FIG. 4 illustrates an optical alignment element 158 of a sight guide 150 according to an embodiment. The optical alignment element 158 may be a translucent (e.g., transparent) solid block that is able to fit within the cavity 156 of the sight guide 150. The optical alignment element 158 may have a cylindrical shape. In an example, the optical alignment element 158 has a crosshair marking 160 thereon. The crosshair marking 160 may be used to provide a reference for aligning the jig 102 with a planned hole location on a work piece, as described in more detail herein. The user is able to look through the optical alignment element 158 to view the crosshair marking 160 as well as a portion of the environment (e.g., the work piece) beyond the optical alignment element 158. The optical alignment element 158 may be held in the sight guide 150 via a friction fit, an adhesive, and/or the like.

Optionally, the debris collection assembly 100 may include one or more adapter inserts 106 designed to receive and guide a drill attachment member that is not a drill bit or the optical alignment element 158. For example, one adapter insert 106 may receive and guide a wire brush.

Reference is made to FIGS. 1 through 4 to describe an example process of using the debris collection assembly 100 to drill a hole in a work piece. The user may mark on the surface of the work piece to indicate a planned hole location. The user may use a writing instrument or the like to mark the planned hole location. The user may secure the jig 102 to the work piece at or proximate to the planned hole location using a clamp. The user may position the jig 102 so the front wall 114 (e.g., the flange 134) faces and optionally abuts the surface of the work piece. The user may load the sight guide adapter insert 150 into the adapter opening 162 of the jig 102. The sight guide adapter insert 150 includes the optical alignment element 158. The user may use the sight guide adapter insert 150 to provide fine adjustment of the jig 102 relative to the work piece so that the planned hole location aligns with the crosshair marking 160 on the optical alignment element 158. For example, the user may look through the optical alignment element 158 to determine whether the planned hole location is aligned with the crosshair marking 160. If the two are not aligned, the user can make slight adjustments to the clamp and/or jig 102 until alignment is achieved.

Once aligned and the jig 102 is secured in place on the work piece, the user may substitute the sight guide 150 for the drill guide adapter insert 152. A drill bit of a drill 112 may be inserted through the orifice 154 of the drill guide 152. The jig 102 has an aperture through the front wall 114. The drill bit may extend through the aperture to contact the surface of the work piece at the planned hole location. As the drill 112 rotates the drill bit, a distal tip of the drill bit protrudes beyond the front wall 114 to drill a hole in the work piece. As the drill bit rotates, the vacuum 104 provides a negative pressure that draws airflow through an interior cavity of the jig 102. For example, the airflow is drawn into the housing 132 through the air inlet 166. The stream of air may be relatively high velocity. The air stream within the interior cavity of the jig 102 flows along a distal segment of the drill guide adapter insert 152 and around a portion of the drill bit. The airflow blows swarf (e.g., shavings, chips, dust, powder, and/or other debris) generated by the drilling through the vacuum port 122 and into the vacuum 104. The swarf that is captured may be collected and contained in a receptacle 116 of the vacuum 104. The swarf is captured and contained so it does not enter the surrounding environment and land on nearby wires, instruments, electronics, and/or equipment.

In an example, the drill 112 is a pneumatic drill that is powered by pressurized (e.g., compressed) air. The drill 112 may receive compressed air through a hose 124 that is connected to a compressed air source 126. The drill 112 may be mechanically connected to the hose 124 via an air-line coupler 111. The drill 112 and compressed air source 126 are each generically represented in block form in FIG. 1. The compressed air source 126 may be a tank or reservoir. In an example, the vacuum 104 may be pneumatic and powered by compressed air received through a second hose 128. For example, the vacuum 104 may be a venturi-style vacuum in which compressed air powers a turbine and/or venturi that creates a suction (e.g., negative pressure).

In an embodiment, the drill 112 and the vacuum 104 are both powered by the same compressed air source 126, such that the compressed air source 126 supplies compressed air to power both the vacuum 104 and the drill 112. In an example, the debris collection assembly 100 includes an air valve 130 that is connected to the compressed air source 126. The air valve 130 is also connected to each of the drill 112 and the vacuum 104 via the two hoses 124, 128, respectively. The air valve 130 may split a compressed air stream from the source 126 into each of the hoses 124, 128. The air valve 130 may assure that the vacuum 104 and the drill 112 are both powered at the same time. For example, the air valve 130 may require that the vacuum 104 is active while the pneumatic drill 112 is operational. The drill 112 is operational when there is power to the drill 112, such that pressing the trigger of the drill 112 would power rotation of the drill bit (even if the drill 112 is not currently rotating the drill bit). The air valve 130 may require that the vacuum 104 is active while the pneumatic drill 112 is operational by ensuring that the drill 112 cannot receive compressed air through the hose 124 without the vacuum 104 also receiving compressed air through the second hose 128. Configuring the drill 112 and vacuum 104 in this way avoids the risk of a mechanic forgetting to turn on the vacuum 104 before drilling into the work piece through the jig 102. The pneumatic drill 112 and vacuum 104 may be particularly useful when drilling in sensitive environments, such as near fuel cells. In an alternative embodiment, the drill 112 and the vacuum 104 may be electrically-powered by a battery or electrical power circuit. Optionally, the debris collection assembly 100 may include a switch device electrically connected to the drill 112 that requires the vacuum 104 to be active in order for the drill 112 to be operational.

Figure 5:
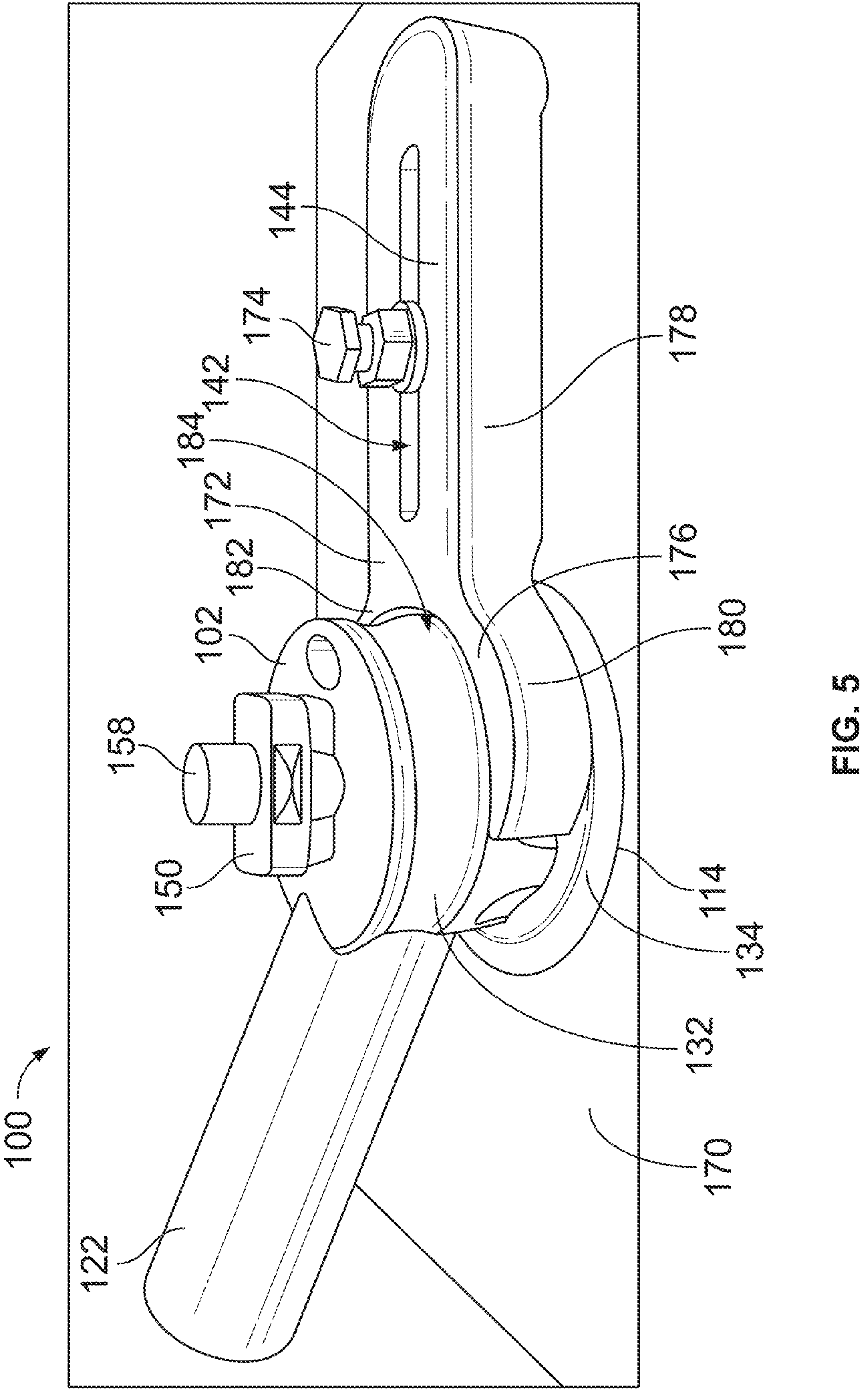
FIG. 5 illustrates the debris collection assembly installed on a work piece.

FIG. 5 illustrates the debris collection assembly 100 installed on a work piece 170. The debris collection assembly 100 includes a clamp 172 that secures the jig 102 to the work piece 170 via one or more fasteners 174. The clamp 172 secures the jig 102 in a fixed position, which allows the user to quickly and easily drill into the work piece 170 at the planned hole location without having to hold the jig 102 in place. The jig 102 is shown with the sight guide adapter insert 150 and the optical alignment element 158 installed.

The clamp 172 has a jaw 176 and a handle 178 that extends from the jaw 176. The jaw 176 is designed to couple to the jig 102. For example, the jaw 176 may include a first arm 180 and a second arm 182 that define a mouth 184 of the jaw 176. The first and second arms 180, 182 may be rigid arms that are fixed in place. The mouth 184 may be sized and shaped based on the size and shape of the housing 132 of the jig 102. The mouth 184 is larger than the perimeter of the housing 132 and smaller than the perimeter of the flange 134. As a result, the housing 132 is received within the mouth 184 of the jaw 176, and the arms 180, 182 contact the back surface 136 of the flange 134. For example, the arms 180, 182 of the clamp 172 hold the flange 134 against the surface of the work piece 170. The flange 134 is pinched between the arms 180, 182 and the work piece 170.

The handle 178 of the clamp 172 may define an elongated slot 142 that extends through a thickness of the handle 178. The elongated slot 142 is oriented to extend in a direction away from the jaw 176. The elongated slot 142 is sized to receive one or more fasteners 174 therein. A single fastener 174 is shown in the slot 142 in FIG. 5. The fastener 174 may be a bolt, a pin, a screw, a post, a rivet, or the like. In an example, the fastener 174 may be a Cleco pin. For example, the fastener 174 may be a removable rivet. The fastener 174 may be installed to extend through the slot 142 and into an existing hole in the work piece 170. The fastener 174 may be tightened into contact with a back side 144 of the handle 178 to secure the clamp 172 to the work piece 170. The elongated slot 142 and repositionable interface between the jig 102 and the clamp 172 enables the debris collection assembly 100 to have a relatively large coverage area relative to existing holes in the work piece 170. For example, the clamp 172 can slide relative to the fastener 174 along the length of the slot 142 and can rotate relative to the fastener 174 to extend from the existing hole in any direction along the surface of the work piece 170.

In an example, the housing 132 of the jig 102 has a cylindrical shape, and the jaw 176 of the clamp 172 defines a rounded (e.g., semi-circular) mouth 184 to accommodate the cylindrical housing 132. The first and second arms 180, 182 may surround at least a third of the circumference of the housing 132. In an example, the first and second arms 180, 182 surround at least half of the circumference of the housing 132. Optionally, the housing 132 includes multiple ribs alternating with dimples around the perimeter of the housing 132. The dimples may be notches or depressions located between and separating the ribs. The ribs and dimples may be adjacent to the flange 134. The ribs and dimples may assist the clamp 172 with gripping the jig 102 and holding the jig 102 in place on the work piece 170. For example, the arms 180, 182 of the clamp 172 may include protrusions that are received into the dimples to lock a rotational orientation of the jig 102 relative to the clamp 172. The ribs and dimples may also assist the user with gripping the jig 102.

In an example, the flange 134 may have a non-slip surface for enhancing friction between the jig 102 and the work piece 170 to reduce the risk of slippage. For example, the front wall 114 of the jig 102 along the flange 134 may have a pad. The pad may be composed of urethane, rubber, a rubber-like material, or the like. The non-slip surface may also prohibit the jig 102 from scratching the surface of the work piece 170. In another example, the flange 134 may include one or more suction cups mounted on the front wall 114 to releasably secure the jig 102 to the work piece 170.

In this example, the suction cups can be used to secure the jig 102 either in addition to the clamp 172 or instead of the clamp 172.

In an example, the vacuum port 122 of the jig 102 may be angled away from the front wall 114 and the flange 134. For example, the vacuum port 122 may extend in a radial direction away from the housing 132, and may also extend along a height dimension in a direction away from the front wall 114. The height dimension is perpendicular to the plane of the front wall 114 and the flange 134. The orientation of the vacuum port 122 may provide more convenient coupling to the vacuum hose 108 (shown in FIG. 1).

In an example application, the working environment may be an area of an aircraft that is near sensitive and/or safety-critical components. For example, electrical wire harnesses may be near the stanchion. The area may be a flight deck behind glass cockpit displays. The debris collection assembly 100 operates to capture and collect the debris generated by drilling to avoid the risk of metal chips or shavings electrically shorting two or more wires. Once the debris collection assembly 100 is installed, the drilling operation may be performed without the need for masking the surfaces in the environment or fashioning a bag around the drilling location. The debris collection assembly 100 is not limited to use in sensitive and/or safety-critical areas, and is also not limited to use onboard aircraft. The debris collection assembly 100 may provide benefits in various different industries and applications. For example, carpenters and builders may use the debris collection assembly 100 in the construction of buildings. Automakers may use the debris collection assembly 100 to build new vehicles, and space companies may use the debris collection assembly 100 to build spacecraft.

Figure 6:
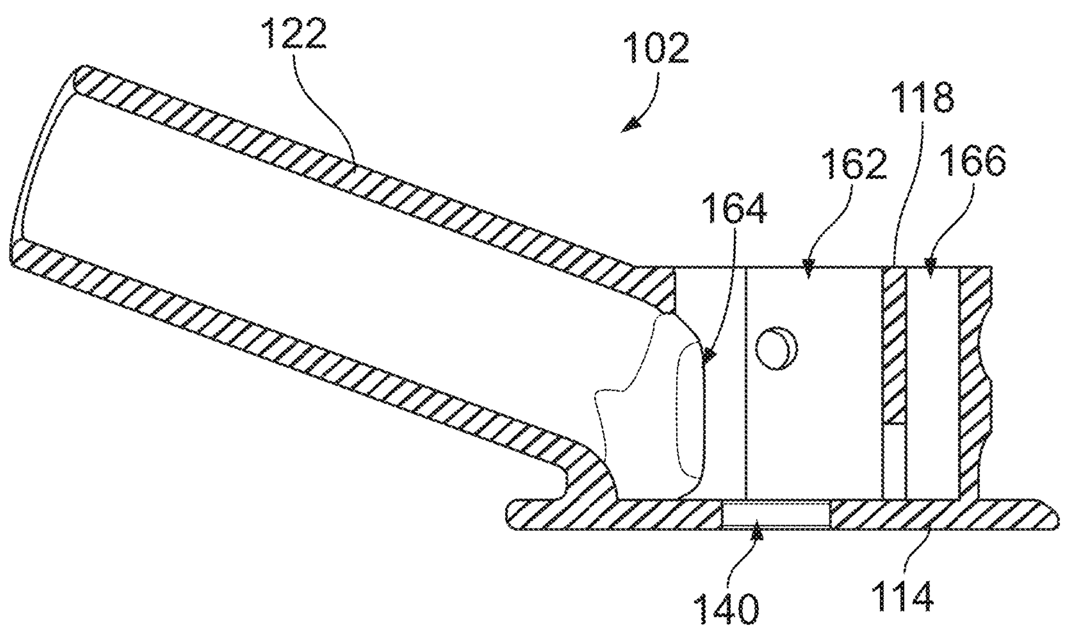
FIG. 6 is a cross-sectional view of the jig of the debris collection assembly according to an embodiment.

FIG. 6 is a cross-sectional view of the jig 102 of the debris collection assembly 100 according to an embodiment. The cross-section line bisects the jig 102, extending along the length of the vacuum port 122 and through both the air inlet 166 and the adapter opening 162. The jig 102 defines an aperture 140 that extends through the front wall 114. For example, the aperture 140 aligns with the adapter opening 162 in the back wall 118. The adapter opening 162 may have a greater size (e.g., area) than the aperture 140. The jig 102 defines an interior cavity 164 that fluidly connects the aperture 140, the adapter opening 162, the air inlet 166, and the vacuum port 122. For example, the interior cavity 164 defines an air pathway that extends from the air inlet 166 across both the adapter opening 162 and the aperture 140 to the vacuum port 122.

In an example, the front wall 114 may be planar. Alternatively, the front wall 114 may have a non-planar shape. For example, the non-planar shape may be designed to conform to a curvature and/or angle of the work piece. For example, if the surface of the work piece to drill is concave, the jig 102 may be designed with a convex front wall 114 to nest into the concave work piece. In another example, the front wall 114 may be planar and deflectable or pliable to enable the front wall 114 to conform to a curvature of the work piece.

Figure 7:
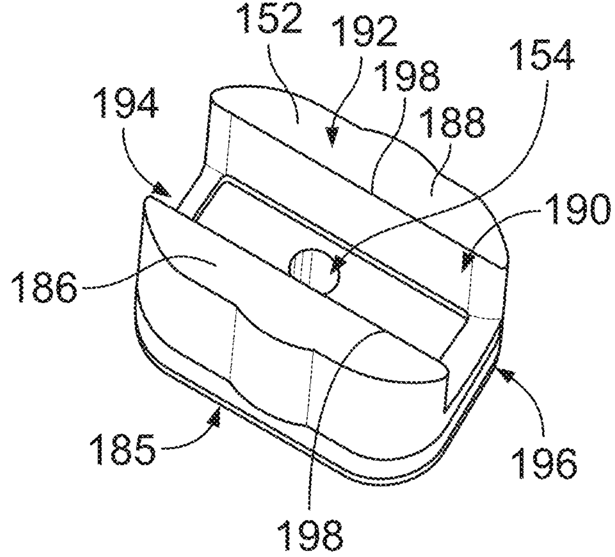
FIG. 7 is an isometric view of a drill guide adapter insert of the debris collection assembly according to an embodiment.

FIG. 7 is an isometric view of the drill guide adapter insert 152 according to an embodiment. The drill guide 152 is removably loaded into the jig 102 through the adapter opening 162. A size and contour of the perimeter of the drill guide 152 may generally match the size and contour of the adapter opening 162 to allow for a relatively tight fit. Other adapter inserts 106 of the debris collection assembly 100 may have the same footprint as the drill guide 152. For example, a perimeter of the drill guide 152 may have the same size and contour as the perimeter of the sight guide 150 (shown in FIG. 3).

The drill guide 152 has the orifice 154 that is sized to receive a drill bit. The drill guide 152 includes a first wall 186 and a second wall 188 that are spaced apart on opposite sides of the orifice 154. The first and second walls 186, 188 are parallel and define a trough 190 therebetween. The trough 190 is an elongated channel or trench that is open at a distal end 192 of the drill guide 152, opposite a proximal end 185 of the drill guide 152. The trough 190 is open along both first and second lateral ends 194, 196 of the respective drill guide 152. When loaded into the jig 102, the trough 190 defines a portion of the air pathway through the interior cavity 164 of the jig 102. The orifice 154 may be located at a lateral center of the trough 190, such that the corresponding drill bit projects through the center of the trough 190.

In an embodiment, the width of the trough 190 between the two walls 186, 188 of the drill guide 152 may be narrower than a diameter of the aperture 140 in the front wall 114 of the jig 102. As such, a portion of distal edges 198 of the first and second walls 186, 188 may be exposed to the swarf that is emitted during a drilling operation through the aperture 140. Some pieces of swarf (e.g., chips or shavings) may contact the distal edges 198 of the walls 186, 188 when sucked into the aperture 140 by the high velocity airflow. The distal edges 198 may break up large pieces of swarf into smaller pieces. The smaller pieces enter the trough 190 and are sucked out of the jig 102 through the vacuum port 122. The drill guide 152 breaks up larger pieces to reduce the risk of plugging the vacuum port 122 and/or the hose 108 attached to the vacuum port 122.

Figure 8:
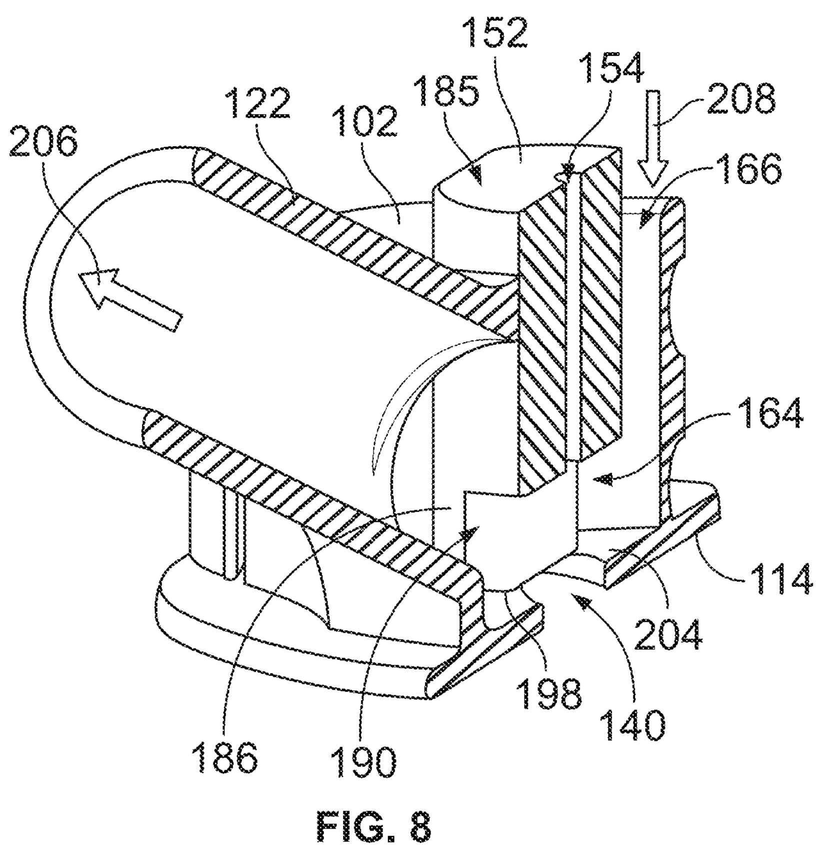
FIG. 8 is a cross-sectional view of the jig with the drill guide adapter insert installed, according to an embodiment.

FIG. 8 is a cross-sectional view of the jig 102 with the drill guide adapter insert 152 installed according to an embodiment. The cross-section line extends through the jig 102 and the drill guide 152. As shown in FIG. 8, the orifice 154 of the drill guide 152 extends from the proximal end 185 to the trough 190. Only the first wall 186 of the drill guide 152 is visible in FIG. 8 due to the cross-section. Optionally, the distal end or edge 198 of the wall 186 may abut against an interior surface 204 of the front wall 114 when the drill guide 152 is fully loaded in the jig 102. A portion of the distal edge 198 may overlap and extend across the aperture 140. That portion of the wall 186 may break up chips and/or shavings into smaller pieces. The trough 190 is fluidly connected to the vacuum port 122 and defines a portion of the air pathway through the interior cavity 164. For example, the air pathway extends from the air inlet 166 through the length of the trough 190 and then out the vacuum port 122.

With additional reference to FIG. 1, the vacuum 104 (when operating) applies a negative pressure at the vacuum port 122 in outgoing direction 206 towards the vacuum 104. The negative pressure draws air from outside of the jig 102 in an incoming direction 208 into the air inlet 166 and through the interior cavity 164. The air stream may have a relatively high velocity. The air stream may flow through the trough 190 and pass around the spinning drill bit that extends through the orifice 154. The air stream through the trough 190 captures swarf (e.g., debris) generated from the drilling. The spinning drill bit may itself increase the suction on the debris in the area right around the drill bit. The swarf that enters the trough 190 through the aperture 140 is blown through the interior cavity 164 to the vacuum port 122 and exits the jig 102 into the vacuum tube 108.

Figure 9:
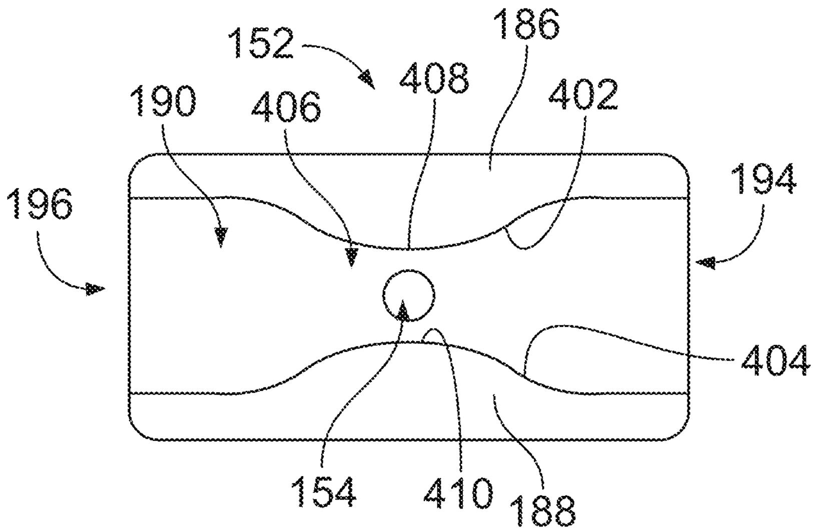
FIG. 9 is a bottom view of the drill guide adapter insert of the debris collection assembly according to another example.

FIG. 9 is a bottom view of the drill guide adapter insert 152 of the debris collection assembly 100 according to another example. In FIG. 9, the trough 190 defined between the first and second walls 186, 188 of the drill guide 152 has a non-uniform width. The width of the trough 190 is the distance from an inner surface 402 of the first wall 186 to an inner surface 404 of the second wall 188. The inner surfaces 402 404 face each other across the trough 190. The trough 190 extends a length from the first lateral end 194 of the drill guide 152 to the second lateral end 196 of the drill guide 152. In the illustrated example, the trough 190 has a narrow or constricted portion 406 midway between the two lateral ends 194, 196. The narrow portion 406 is at the location of the orifice 154 that receives the drill bit. This narrow portion 406 serves as a restriction that increases the air speed through the trough 190 and reduces pressure in the trough 190 via Bernoulli's principle. The tight spacing between the walls 186, 188 also acts as a chip breaker to break up relatively large pieces of swarf.

In an example, the inner surfaces 402, 404 are each angled to have a respective peak 408, 410 which together define the narrow portion 406. The smallest width of the trough 190 is between the two peaks 408, 410. In FIG. 9, the inner surfaces 402, 404 are curved. For example, the inner surfaces 402, 404 have convex curves that bow toward each other and are closest to each other at the location of the orifice 154. The inner surfaces 402, 404 may be more angular rather than curved in another example.

Figure 10:
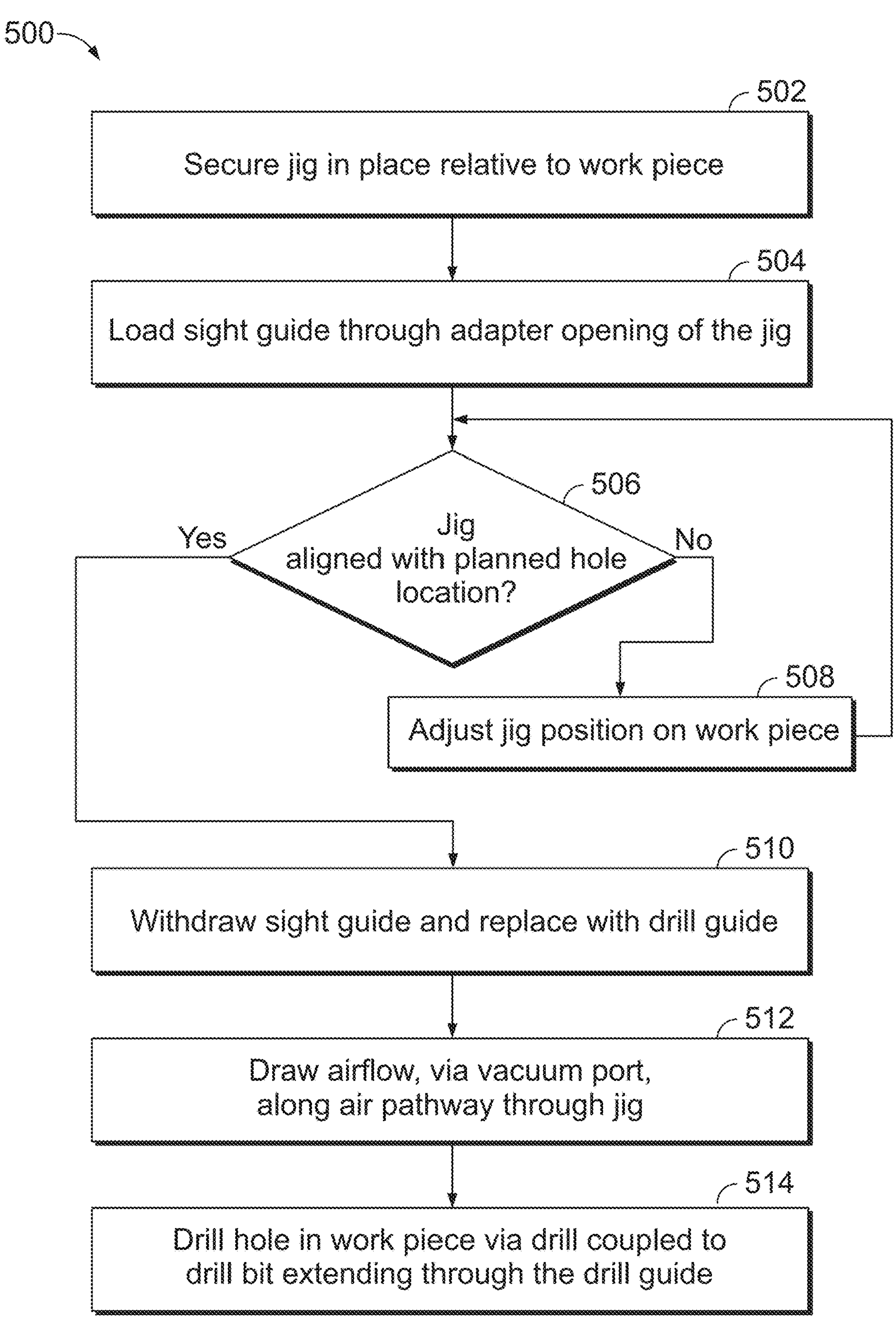
FIG. 10 is a flow chart of a method of collecting and containing swarf during a drilling operation according to an embodiment.

FIG. 10 is a flow chart 500 of a method of collecting and containing swarf during a drilling operation according to an embodiment. The method may be performed using the debris collection assembly 100 described herein. The method optionally may include at least one additional step than shown, at least one fewer step than shown, and/or at least one different step than shown in FIG. 10.

At step 502, a jig 102 is secured in place relative to a work piece 170. The jig 102 includes a front wall 114 and a back wall 118 opposite the front wall 114. The front wall 114 defines an aperture 140 therethrough. The back wall 118 defines an adapter opening 162 that aligns with the aperture 140 in the front wall 114. The jig 102 includes a vacuum port 122 and defines an interior cavity 164 that fluidly connects the aperture 140, the adapter opening 162, and the vacuum port 122. The jig 102 may include a housing 132 and a flange 134. The flange 134 protrudes from the front wall 114 beyond one or more edges of the housing 132.

In an example, the jig 102 is secured in place relative to the work piece 170 by coupling a clamp 172 onto the jig 102 and securing the clamp 172 to the work piece 170 via at least a first fastener 174. The first fastener 174 is spaced apart from the jig 102. The clamp 172 has a first portion that contacts the back surface 136 of the flange 134 to press and hold (e.g., pinch) the flange 134 between the clamp 172 and the work piece 170. The clamp 172 has a second portion that receives the fastener 174. The first portion may be a jaw 176, and the second portion may be a handle 178 that defines an elongated slot 142. In an example, the jig 102 is secured in place by (i) coupling the jaw 176 to the jig 102 so that the jaw 176 at least partially surrounds the housing 132 and contacts the back surface 136 of the flange 134, and (ii) installing at least the first fastener 174 through the elongated slot 142 into an existing hole in the work piece 170 to secure the clamp 172 to the work piece 170.

At step 504, a sight guide adapter insert 150 is loaded through the adapter opening 162 of the jig 102 into the interior cavity 164 of the jig 102. This step may occur before or after securing the jig 102 to the work piece 170. The sight guide adapter insert 150 defines a cavity 156 therethrough that contains an optical alignment element 158 therein.

At step 506, it is determined whether the aperture 140 of the jig 102 is aligned with a planned hole location on the work piece 170. For example, a user may visually peer through the optical alignment element 158 to determine if a marking on the surface of the work piece 170 is centered relative to the optical alignment element 158 and/or aperture 140. The optical alignment element 158 may include a crosshair marking 160. If it is determined that the aperture 140 of the jig 102 is not properly aligned, then flow continues to step 508. At step 508, the jig 102 position is adjusted relative to the work piece 170 in an attempt to increase the alignment with the planned hole location. For example, the fastener 174 on the clamp 172 may be loosened to permit fine adjustment of the jig 102 position before retightening the fastener 174. Once alignment is achieved, flow of the method continues to step 510.

At step 510, the sight guide adapter insert 150 is withdrawn from the jig 102 and replaced with a drill guide adapter insert 152. For example, the drill guide adapter insert 152 is loaded through the adapter opening 162 of the jig 102 into the interior cavity 164 of the jig 102. The drill guide adapter insert 152 defines an orifice 154 therethrough that is sized to receive a drill bit and allow the drill bit to extend through the aperture 140 in the front wall 114. At step 512, airflow is drawn, via a vacuum 104 coupled to the vacuum port 122 of the jig 102, along an air pathway that extends from an air inlet 166 of the jig 102 through the interior cavity 164 to the vacuum port 122. The air pathway extends through a trough 190 defined by the drill guide adapter insert 152.

At step 514, a hole is drilled in the work piece 170 via a drill 112 coupled to the drill bit that is within the orifice 154 of the drill guide adapter insert 152. The airflow is drawn through the interior cavity 164 of the jig 102 to capture debris generated from drilling the hole. In an example, both the drill and the vacuum 104 are powered by compressed air. The method may include supplying compressed air to both the vacuum 104 and the drill from a common compressed air source 126 via an air valve 130.

Figure 11:
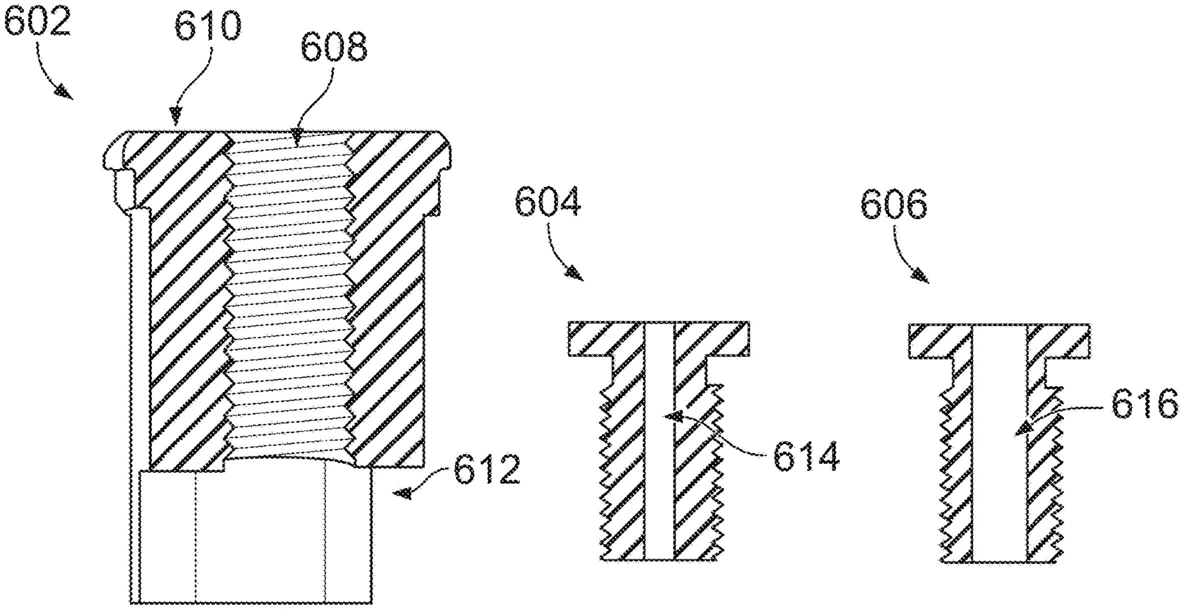
FIG. 11 is a cross-sectional view of a drill guide adapter insert and two drill bushings according to another example.

FIG. 11 is a cross-sectional view of a drill guide adapter insert 602 and two drill bushings 604, 606 according to another example. The drill guide adapter insert 602 is designed to be received in the adapter opening 162 of the jig 102. The drill guide adapter insert 602 may be used instead of the drill guide adapter insert 152 shown in FIGS. 3, 7, and 8. The drill guide adapter insert 602 may include a body that is similar to the drill guide adapter insert 152 in size, contour, perimeter shape, and footprint. The drill guide adapter insert 602 may differ from the drill guide adapter insert 152 by lacking the orifice 154 that is only slightly larger than the diameter of a drill bit. For example, the drill guide adapter insert 602 has cylindrical channel 608 in place of the orifice 154. For example, the cylindrical channel 608 extends from the proximal end 610 of the adapter insert 602 to the trough 612. The cylindrical channel 608 has a diameter that is substantially larger than the diameter of drill bits. The size of the cylindrical channel 608 is designed to accommodate one of the drill bushings 604, 606 at a time.

The first drill bushing 604 defines a first orifice 614 through the length of the first drill bushing 604. The diameter of the first orifice 614 may be sized to accommodate a first drill bit or a first set of drill bits. The second drill bushing 606 defines a second orifice 616 through the length of the second drill bushing 606. The diameter of the second orifice 616 may be sized to accommodate a second drill bit or a second set of drill bits. The second orifice 616 has a larger diameter than the first orifice 614. The orifices 614,

616 are sized to receive the corresponding drill bits and hold the drill bits perpendicular to the front wall 114 of the jig 102 to provide a perpendicular drilling angle. The drill guide adapter insert 602 allows for substituting the drill bushings 604, 606 so that multiple different drill bushings 604, 606 can be used, and multiple different hole sizes can be drilled, without substituting the drill guide adapter insert 602.

The cylindrical channel 608 may be threaded with internal helical threads. The drill bushings 604, 606 may be threaded with external helical threads that are complementary to the internal helical threads in the cylindrical channel 608. This screw mechanism allows selectively coupling the drill bushings 604, 606 to the drill guide adapter insert 602 one at a time. In other examples, the drill bushings 604, 606 may couple to the drill guide adapter insert 602 via an interference fit. For example, the drill bushings 604, 606 and the cylindrical channel 608 may have smooth bearing surfaces that contact and hold the respective bushing 604, 606 in place via friction. In another example, the drill bushings 604, 606 and/or the cylindrical channel 608 may have at least one lip or detent to removably secure the components in the coupled state.

Figure 12:
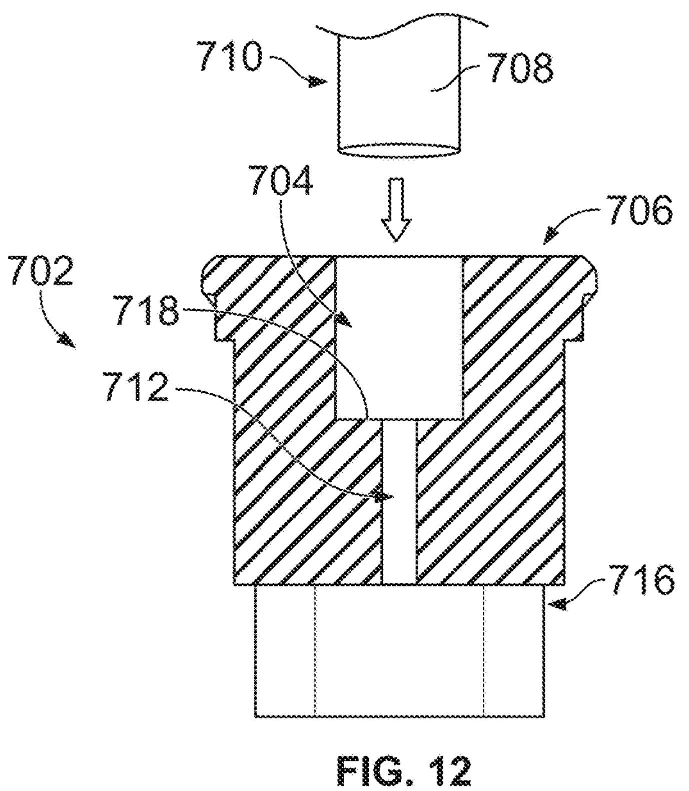
FIG. 12 is an adapter insert according to another example.

FIG. 12 is an adapter insert 702 according to another example. The adapter insert 702 is designed to be received in the adapter opening 162 of the jig 102. The adapter insert 702 may function as a sight guide, so the adapter insert 702 can be used in place of the sight guide 150 shown in FIGS. 3 and 5. The adapter insert 702 may include a body that is similar to the sight guide adapter insert 150 in size, contour, perimeter shape, and footprint. The adapter insert 702 defines a cavity 704 that extends from the proximal end 706 of the adapter insert 702. The cavity 704 of the adapter insert 702 may be sized to receive a distal tip 708 of a scope 710. For example, the scope 710 may be an optical component of a borescope. The distal tip 708 is poised for coupling to the adapter insert 702 in the illustrated example. By inserting the distal tip 708 of the scope 710 into the cavity 704, a person can use the scope 710 for aligning or confirming the alignment of the adapter insert 702 with a target hole location in a work piece.

In an example, the adapter insert 702 is a hybrid adapter insert 702 that can be used as both a sight guide and a drill guide. The adapter insert 702 includes an orifice 712 that extends from the distal end of the cavity 704 to the trough 716. The orifice 712 is coaxial with the cavity 704. The orifice 712 has a smaller size (e.g., cross-sectional area or diameter) than the cavity 704, so that a shoulder 718 is present at the interface between the distal end of the cavity 704 and the orifice 712. The orifice 712 may be sized to receive a drill bit, or a drill bushing, therein. The size and orientation of the orifice 712 may hold the drill bit perpendicular to the front wall 114 of the jig 102 to provide a perpendicular drilling angle. In an example, after loading the adapter insert 702 into the adapter opening 162 of the jig 102, the user may insert the distal tip 708 of the scope 710 into the cavity 704. After verifying that the adapter insert 702 in the jig 102 is aligned with the target hole location, the user may remove the scope 710 and then insert a drill bit or a drill bushing into the orifice 712 for drilling the hole.

Further, the disclosure comprises examples according to the following clauses:

Clause 1. A debris collection assembly comprising:

a jig including a front wall and a back wall opposite the front wall, the front wall defining an aperture therethrough, the back wall defining an adapter opening that aligns with the aperture in the front wall, wherein the jig includes a vacuum port configured to attach to a vacuum tube, the jig defining an interior cavity that fluidly connects the aperture, the adapter opening, and the vacuum port; and a first adapter insert removably loaded through the adapter opening into the interior cavity, the first adapter insert one of (i) defining an orifice that is sized to receive a drill bit or (ii) defining a cylindrical channel that is sized to receive a drill bushing that defines the orifice, the orifice oriented to allow the drill bit to extend through the aperture in the front wall and drill into a work piece, wherein negative pressure at the vacuum port draws airflow through the interior cavity and captures debris generated from drilling.

Clause 2. The debris collection assembly of Clause 1, wherein the jig includes a housing and a flange, the flange protruding from the front wall beyond one or more edges of the housing.

Clause 3. The debris collection assembly of Clause 2, further comprising a clamp that is discrete from the jig, the clamp including a first portion configured to be coupled to the work piece via one or more fasteners and a second portion configured to contact a back surface of the flange to secure the jig in place on the work piece.

Clause 4. The debris collection assembly of Clause 3, wherein the first portion of the clamp includes an elongated slot configured to receive each of the one or more fasteners at a selected location within the elongated slot.

Clause 5. The debris collection assembly of Clause 3, wherein the second portion of the clamp has two arms configured to at least partially surround the housing of the jig and contact the back surface of the flange.

Clause 6. The debris collection assembly of Clause 2, wherein the housing of the jig includes the back wall and defines the interior cavity, wherein the housing is cylindrical.

Clause 7. The debris collection assembly of Clause 2, wherein the housing of the jig has ribs alternating with dimples around a perimeter of the housing.

Clause 8. The debris collection assembly of any of Clauses 1-7, further comprising a second adapter insert removably loaded through the adapter opening into the interior cavity when the first adapter insert is not coupled to the jig, the second adapter insert defining a cavity therethrough that contains an optical alignment element therein for permitting a user to visually verify that the aperture of the jig is aligned with a planned hole location on the work piece.

Clause 9. The debris collection assembly of Clause 8, wherein the optical alignment element is a translucent solid block that is cylindrical and includes a crosshair marking thereon.

Clause 10. The debris collection assembly of any of Clauses 1-9, wherein the jig is a unitary, one-piece body that includes a housing, a flange, and a vacuum port, wherein the vacuum port is a hollow pipe that projects from the housing and is angled relative to a plane defined by the flange.

Clause 11. The debris collection assembly of any of Clauses 1-10, wherein the first adapter insert includes a first wall and a second wall that are spaced apart on opposite sides of the orifice and define a trough therebetween at a distal end of the adapter insert, wherein the trough receives the airflow that is drawn through the interior cavity of the jig to capture the debris and direct the debris towards the vacuum port.

Clause 12. The debris collection assembly of Clause 11, wherein the trough is narrower than a diameter of the aperture of the jig and distal edges of the first and second walls of the first adapter insert are configured to break up pieces of the debris prior to the debris entering the vacuum port.

Clause 13. A method of collecting and containing swarf during a drilling operation, the method comprising:

securing a jig in place relative to a work piece, the jig including a front wall and a back wall opposite the front wall, the front wall defining an aperture therethrough, the back wall defining an adapter opening that aligns with the aperture in the front wall, wherein the jig includes a vacuum port and defines an interior cavity that fluidly connects the aperture, the adapter opening, and the vacuum port;

loading a first adapter insert through the adapter opening into the interior cavity of the jig, the first adapter insert one of (i) defining an orifice therethrough that is sized to receive a drill bit or (ii) defining a cylindrical channel that is sized to receive a drill bushing that defines the orifice, the orifice oriented to allow the drill bit to extend through the aperture in the front wall;

drawing airflow, via a vacuum coupled to the vacuum port of the jig, along an air pathway that extends from an air inlet of the jig through the interior cavity to the vacuum port; and drilling a hole in the work piece via a drill coupled to the drill bit that is within the orifice, wherein the airflow is drawn through the interior cavity to capture debris generated from drilling the hole.

Clause 14. The method of Clause 13, wherein the jig includes a housing and a flange, the flange protruding from the front wall beyond one or more edges of the housing, wherein securing the jig in place relative to the work piece comprises coupling a clamp onto the jig and securing the clamp to the work piece via one or more fasteners, wherein the clamp has a first portion configured to contact a back surface of the flange to hold the flange between the clamp and the work piece.

Clause 15. The method of Clause 14, wherein the clamp includes a jaw and a handle that defines an elongated slot, wherein the securing the jig in place comprises (i) coupling the jaw to the jig so that the jaw at least partially surrounds the housing and contacts the back surface of the flange, and (ii) installing at least a first fastener through the elongated slot into an existing hole in the work piece to secure the clamp to the work piece.

Clause 16. The method of any of Clauses 13-15, further comprising:

loading a second adapter insert through the adapter opening into the interior cavity of the jig prior to loading the first adapter insert and after securing the jig to the work piece, wherein the second adapter insert defines a cavity therethrough that contains an optical alignment element therein; and withdrawing the second adapter insert from the jig and replacing the second adapter insert with the first adapter insert after visually verifying, via the optical alignment element, that the aperture of the jig is aligned with a planned hole location on the work piece.

Clause 17. The method of any of Clauses 13-16, wherein both the drill and the vacuum are powered by compressed air, and the method comprises supplying compressed air to both the vacuum and the drill from a common compressed air source via an air valve.

Clause 18. A debris collection assembly comprising:

a jig including a housing and a flange, the housing including a front wall and a back wall opposite the front wall, the front wall defining an aperture therethrough, the back wall defining an adapter opening that aligns with the aperture in the front wall, wherein the jig includes a vacuum port configured to attach to a vacuum tube, the jig defining an interior cavity that fluidly connects the aperture, the adapter opening, and the vacuum port, wherein the flange protrudes from the front wall of the housing beyond one or more edges of the housing;

a first adapter insert removably loaded through the adapter opening into the interior cavity, the first adapter insert one of (i) defining an orifice therethrough that is sized to receive a drill bit or (ii) defining a cylindrical channel that is sized to receive a drill bushing that defines the orifice, the orifice oriented to allow the drill bit to extend through the aperture in the front wall to drill into a work piece, wherein negative pressure at the vacuum port draws airflow through the interior cavity and captures debris generated from drilling; and a clamp including a first portion and a second portion, the first portion configured to be coupled to the work piece via at least a first fastener, the second portion configured to contact a back surface of the flange to secure the jig in place on the work piece.

Clause 19. The debris collection assembly of Clause 18, wherein the first portion of the clamp includes an elongated slot configured to receive the first fastener at a selected location within the elongated slot, and the second portion has two arms configured to at least partially surround the housing of the jig and contact the back surface of the flange.

Clause 20. The debris collection assembly of Clause 18 or Clause 19, wherein the housing is cylindrical, and the flange radially projects beyond the housing along an entire circumference of the housing.

While various spatial and direction terms such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A debris collection assembly comprising:

a jig including a housing, a flange, a front wall and a back wall opposite the front wall, the flange protruding from the front wall beyond one or more edges of the housing, the front wall defining an aperture therethrough, the back wall defining an adapter opening that aligns with the aperture in the front wall, wherein the jig includes a vacuum port configured to attach to a vacuum tube, the jig defining an interior cavity that fluidly connects the aperture, the adapter opening, and the vacuum port;

a first adapter insert removably loaded through the adapter opening into the interior cavity, the first adapter insert one of (i) defining an orifice that is sized to receive a drill bit or (ii) defining a cylindrical channel that is sized to receive a drill bushing that defines the orifice, the orifice oriented to allow the drill bit to extend through the aperture in the front wall to drill into a work piece, wherein negative pressure at the vacuum port draws airflow through the interior cavity and captures debris generated from drilling; and a clamp that is discrete from the jig, the clamp including a first portion configured to be coupled to the work piece via one or more fasteners and a second portion configured to contact a back surface of the flange to secure the jig in place on the work piece.

2. The debris collection assembly of claim 1, wherein the first portion of the clamp includes an elongated slot configured to receive each of the one or more fasteners at a selected location within the elongated slot.

3. The debris collection assembly of claim 1, wherein the second portion of the clamp has two arms configured to at least partially surround the housing of the jig and contact the back surface of the flange.

4. The debris collection assembly of claim 1, wherein the housing of the jig includes the back wall and defines the interior cavity, wherein the housing is cylindrical.

5. The debris collection assembly of claim 1, wherein the housing of the jig has ribs alternating with dimples around a perimeter of the housing.

6. The debris collection assembly of claim 1, further comprising a second adapter insert removably loaded through the adapter opening into the interior cavity when the first adapter insert is not coupled to the jig, the second adapter insert defining a cavity therethrough that contains an optical alignment element therein for permitting a user to visually verify that the aperture of the jig is aligned with a planned hole location on the work piece.

7. The debris collection assembly of claim 6, wherein the optical alignment element is a translucent solid block that is cylindrical and includes a crosshair marking thereon.

8. The debris collection assembly of claim 1, wherein the jig is a unitary, one-piece body that includes the housing, the flange, and the vacuum port, wherein the vacuum port is a hollow pipe that projects from the housing and is angled relative to a plane defined by the flange.

9. The debris collection assembly of claim 1, wherein the first adapter insert includes a first wall and a second wall that are spaced apart on opposite sides of the orifice and define a trough therebetween at a distal end of the adapter insert, wherein the trough receives the airflow that is drawn through the interior cavity of the jig to capture the debris and direct the debris towards the vacuum port.

10. The debris collection assembly of claim 9, wherein the trough is narrower than a diameter of the aperture of the jig and distal edges of the first and second walls of the first adapter insert are configured to break up pieces of the debris prior to the debris entering the vacuum port.

11. A method using the debris collection assembly of claim 1, the method comprising:

securing the jig in place relative to the work piece;

loading the first adapter insert through the adapter opening into the interior cavity of the jig;

drawing airflow, via the vacuum coupled to the vacuum port of the jig, along an air pathway that extends from an air inlet of the jig through the interior cavity to the vacuum port; and drilling a hole in the work piece via the drill coupled to the drill bit that is within the orifice of the first adapter insert, wherein the airflow is drawn through the interior cavity to capture debris generated from drilling the hole.

12. The method of claim 11, wherein securing the jig in place relative to the work piece comprises coupling the clamp onto the jig and securing the clamp to the work piece via the one or more fasteners.

13. The method of claim 12, wherein the clamp includes a jaw and a handle that defines an elongated slot, wherein the securing the jig in place comprises (i) coupling the jaw to the jig so that the jaw at least partially surrounds the housing and contacts the back surface of the flange, and (ii) installing at least a first fastener through the elongated slot into an existing hole in the work piece to secure the clamp to the work piece.

14. The method of claim 11, further comprising:

loading a second adapter insert through the adapter opening into the interior cavity of the jig prior to loading the first adapter insert and after securing the jig to the work piece, wherein the second adapter insert defines a cavity therethrough that contains an optical alignment element therein; and withdrawing the second adapter insert from the jig and replacing the second adapter insert with the first adapter insert after visually verifying, via the optical alignment element, that the aperture of the jig is aligned with a planned hole location on the work piece.

15. The method of claim 11, wherein both the drill and the vacuum are powered by compressed air, and the method comprises supplying compressed air to both the vacuum and the drill from a common compressed air source via an air valve.

16. A debris collection assembly comprising:

a jig including a housing and a flange, the housing including a front wall and a back wall opposite the front wall, the front wall defining an aperture therethrough, the back wall defining an adapter opening that aligns with the aperture in the front wall, wherein the jig includes a vacuum port configured to attach to a vacuum tube, the jig defining an interior cavity that fluidly connects the aperture, the adapter opening, and the vacuum port, wherein the flange protrudes from the front wall of the housing beyond one or more edges of the housing;

a first adapter insert removably loaded through the adapter opening into the interior cavity, the first adapter insert one of (i) defining an orifice therethrough that is sized to receive a drill bit or (ii) defining a cylindrical channel that is sized to receive a drill bushing that defines the orifice, the orifice oriented to allow the drill bit to extend through the aperture in the front wall to drill into a work piece, wherein negative pressure at the vacuum port draws airflow through the interior cavity and captures debris generated from drilling; and a clamp including a first portion and a second portion, the first portion configured to be coupled to the work piece via at least a first fastener, the second portion configured to contact a back surface of the flange to secure the jig in place on the work piece.

17. The debris collection assembly of claim 16, wherein the first portion of the clamp includes an elongated slot configured to receive the first fastener at a selected location within the elongated slot, and the second portion has two arms configured to at least partially surround the housing of the jig and contact the back surface of the flange.

18. The debris collection assembly of claim 16, wherein the housing is cylindrical, and the flange radially projects beyond the housing along an entire circumference of the housing.

19. The debris collection assembly of claim 16, further comprising a second adapter insert removably loaded through the adapter opening into the interior cavity when the first adapter insert is not coupled to the jig, the second adapter insert defining a cavity therethrough that contains an optical alignment element therein for permitting a user to visually verify that the aperture of the jig is aligned with a planned hole location on the work piece.

20. The debris collection assembly of claim 19, wherein the optical alignment element is a translucent solid block that is cylindrical and includes a crosshair marking thereon.

* * * * *